(12) United States Patent
Pulijala et al.

(10) Patent No.: US 8,527,347 B2
(45) Date of Patent: Sep. 3, 2013

(54) INTEGRATION ARCHITECTURE FOR MOBILE ADVERTISEMENT CAMPAIGN MANAGEMENT, MARKETPLACE AND SERVICE PROVIDER INTERFACE

(75) Inventors: Amitha Pulijala, Milpitas, CA (US); Terje Strand, San Francisco, CA (US); Sharath Rajasekar, San Jose, CA (US); Phelim O'Doherty, San Francisco, CA (US); Daniel Jansson, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 330 days.

(21) Appl. No.: 12/945,761

(22) Filed: Nov. 12, 2010

(65) Prior Publication Data
US 2011/0112906 A1 May 12, 2011

Related U.S. Application Data

(60) Provisional application No. 61/260,798, filed on Nov. 12, 2009.

(51) Int. Cl.
*G06Q 30/00* (2012.01)

(52) U.S. Cl.
USPC .................... 705/14.64; 705/14.66

(58) Field of Classification Search
USPC ........................... 705/14.64, 14.66
See application file for complete search history.

(56) References Cited

U.S. PATENT DOCUMENTS

| | | | |
|---|---|---|---|
| 7,865,394 B1 * | 1/2011 | Calloway et al. | 705/14.4 |
| 7,886,347 B2 * | 2/2011 | Gill et al. | 726/9 |
| 8,099,316 B2 | 1/2012 | Moukas et al. | |
| 8,165,916 B2 * | 4/2012 | Hoffberg et al. | 705/14.53 |
| 2004/0205135 A1 | 10/2004 | Hallam-Baker | |
| 2006/0206355 A1 | 9/2006 | Cheung et al. | |
| 2006/0288100 A1 * | 12/2006 | Carson et al. | 709/224 |
| 2007/0027850 A1 * | 2/2007 | Chan et al. | 707/3 |
| 2007/0066353 A1 * | 3/2007 | Silverbrook et al. | 455/557 |
| 2007/0088605 A1 | 4/2007 | Ghate et al. | |
| 2007/0088801 A1 * | 4/2007 | Levkovitz et al. | 709/217 |
| 2007/0088851 A1 * | 4/2007 | Levkovitz et al. | 709/246 |
| 2007/0088852 A1 * | 4/2007 | Levkovitz | 709/246 |

(Continued)

OTHER PUBLICATIONS

International Preliminary Examination Report dated May 24, 2012 for Application No. PCT/US2010/056593, 6 pages.

(Continued)

*Primary Examiner* — John G Weiss
*Assistant Examiner* — Adam Chornesky
(74) *Attorney, Agent, or Firm* — Fliesler Meyer LLP

(57) ABSTRACT

A communications marketing and advertising system is described for delivering advertising content to subscribers of a telecommunications network. The system includes a marketplace component accessible by advertisers and ad space owners, which is used to create ad space for delivering content to subscribers of a telecommunications network. The marketplace allows advertisers to submit bids on the ad space and the ad space owners to approve or reject the bids. The system also includes a campaign manager that creates a campaign upon determining that the bid has been approved by the ad space owner. The campaign includes a set of messages containing ad content to be sent out to the subscribers. The subscriber profile module of the system obtains profile data associated with the subscribers of the telecommunications network and customizes the content of the messages according to the profile data. The ad engine delivers the messages to the recipients.

18 Claims, 8 Drawing Sheets

(56) References Cited

U.S. PATENT DOCUMENTS

| | | |
|---|---|---|
| 2007/0142052 A1* | 6/2007 | Kalavade ..................... 455/445 |
| 2007/0161409 A1* | 7/2007 | Ohtsuki et al. ............... 455/564 |
| 2007/0191040 A1 | 8/2007 | Kadar et al. |
| 2007/0244760 A1 | 10/2007 | Bodnar et al. |
| 2008/0070558 A1* | 3/2008 | Lovell ........................ 455/414.1 |
| 2008/0120129 A1 | 5/2008 | Seubert et al. |
| 2008/0167957 A1 | 7/2008 | Steelberg et al. |
| 2008/0195462 A1* | 8/2008 | Magdon-Ismail et al. ...... 705/10 |
| 2008/0235327 A1* | 9/2008 | Maes et al. ................... 709/203 |
| 2008/0255936 A1 | 10/2008 | Ghate |
| 2008/0255944 A1 | 10/2008 | Shah et al. |
| 2008/0275753 A1 | 11/2008 | Protheroe et al. |
| 2008/0275777 A1 | 11/2008 | Protheroe et al. |
| 2008/0307108 A1 | 12/2008 | Yan et al. |
| 2008/0318559 A1* | 12/2008 | Porco ........................ 455/414.2 |
| 2009/0012807 A1 | 1/2009 | Atherton et al. |
| 2009/0089131 A1* | 4/2009 | Moukas et al. ................ 705/8 |
| 2009/0094114 A1 | 4/2009 | Rice et al. |
| 2009/0171948 A1 | 7/2009 | Solomon et al. |
| 2009/0198579 A1* | 8/2009 | Lewis et al. .................. 705/14 |
| 2009/0199114 A1* | 8/2009 | Lewis et al. .................. 715/763 |
| 2009/0216682 A1* | 8/2009 | Foladare et al. ............... 705/80 |
| 2009/0217316 A1* | 8/2009 | Gupta ......................... 725/32 |
| 2009/0240586 A1 | 9/2009 | Ramer et al. |
| 2009/0298480 A1* | 12/2009 | Khambete et al. ......... 455/414.1 |
| 2009/0306834 A1 | 12/2009 | Hjelm et al. |
| 2009/0307091 A1* | 12/2009 | Lilley ........................ 705/14.58 |
| 2010/0058383 A1* | 3/2010 | Chang et al. .................... 725/35 |
| 2010/0063877 A1 | 3/2010 | Soroca et al. |
| 2010/0107191 A1 | 4/2010 | Feng et al. |
| 2010/0142421 A1 | 6/2010 | Schlicht et al. |
| 2010/0161638 A1* | 6/2010 | Macrae ........................ 707/759 |
| 2010/0291924 A1* | 11/2010 | Antrim et al. ................. 455/433 |
| 2010/0312643 A1* | 12/2010 | Gil ............................ 705/14.55 |
| 2011/0065421 A1 | 3/2011 | Gluck et al. |
| 2011/0112905 A1 | 5/2011 | Pulijala et al. |
| 2011/0112906 A1* | 5/2011 | Pulijala et al. ............. 705/14.64 |
| 2011/0191163 A1* | 8/2011 | Allaire et al. .............. 705/14.39 |
| 2012/0179534 A1 | 7/2012 | Moukas et al. |
| 2012/0208512 A1 | 8/2012 | Maharajh et al. |

OTHER PUBLICATIONS

Business_Process_Execution_Languag02nov2012; Wikipedia Nov. 2, 2012.

rfc3588_DiameterProtocolAAA—providing Authentication, Authorization and Accounting; Sun Microsystems, Cisco Systems; Sep. 2003.

Diameter_(protocol); http://en.wikipedia.orglwikilDiameter_(protocol); accessed by Examiner Nov. 6, 2012.

Oracle; Oracle Communications Marketing and Advertising; System Owner User's Guide Release 5.0.0.0 E15497-01; Nov. 2009; 260798, Appendix to the Specification, Whole Document.

\* cited by examiner

INTEGRATION ARCHITECTURE FOR MOBILE ADVERTISEMENT CAMPAIGN MANAGEMENT, MARKETPLACE AND SERVICE PROVIDER INTERFACE

CLAIM OF PRIORITY

The present application claims the benefit of U.S. Provisional Patent Application No. 61/260,798, entitled "COMMUNICATIONS MARKETING AND ADVERTISING SYSTEM AND METHOD", by Sharath Rajasekar et al., filed on Nov. 12, 2009, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to systems for delivering marketing and advertisements over various forms of mobile or land-based communications, such as the short messaging service (SMS), the multimedia messaging service (MMS) and others.

BACKGROUND

Online integration with various communication devices is creating new realms for advertisers and other content providers. Marketing campaigns in the past have been mostly focused on television, radio, paper media and internet. Today's advertisers are seeking a more tailored and personalized approach. Rather than bombarding the masses with general interest ads, the advertisers are slowly becoming more focused on selected groups of people that have a common interest in a particular subject, product or service. This is proving to enable both higher returns on investment (ROI) on the part of the advertiser, as well as less annoyance and frustration on the part of the consumer.

One area potentially important for mining advertising revenues is in the industry rivalries between network operators (e.g. T-Mobile, Verizon Wireless, AT&T, etc.) on the one hand and internet service providers (ISPs), online ad vendors and various other content providers on the other. While ad server vendors, such as Google, have shown a very successful business model in online advertising, network operators have played a much less significant part in targeting ads. Yet network operators are uniquely and favorably positioned in the marketplace for obtaining various information and managing diverse relationships between a multitude of players. In addition to having access to the user's preferences and data, the operator also controls many aspects of the communication transmission in the network. For example, the network operator owns the mobile cellular network and its hardware elements (SMS-C, MMS-C, etc) as well as the information regarding its subscribers. As new services and products emerge, it is desirable for network operators to manage and monetize their positions in order to continue to be able to compete in the future.

DETAILED DESCRIPTION

Figure 1:
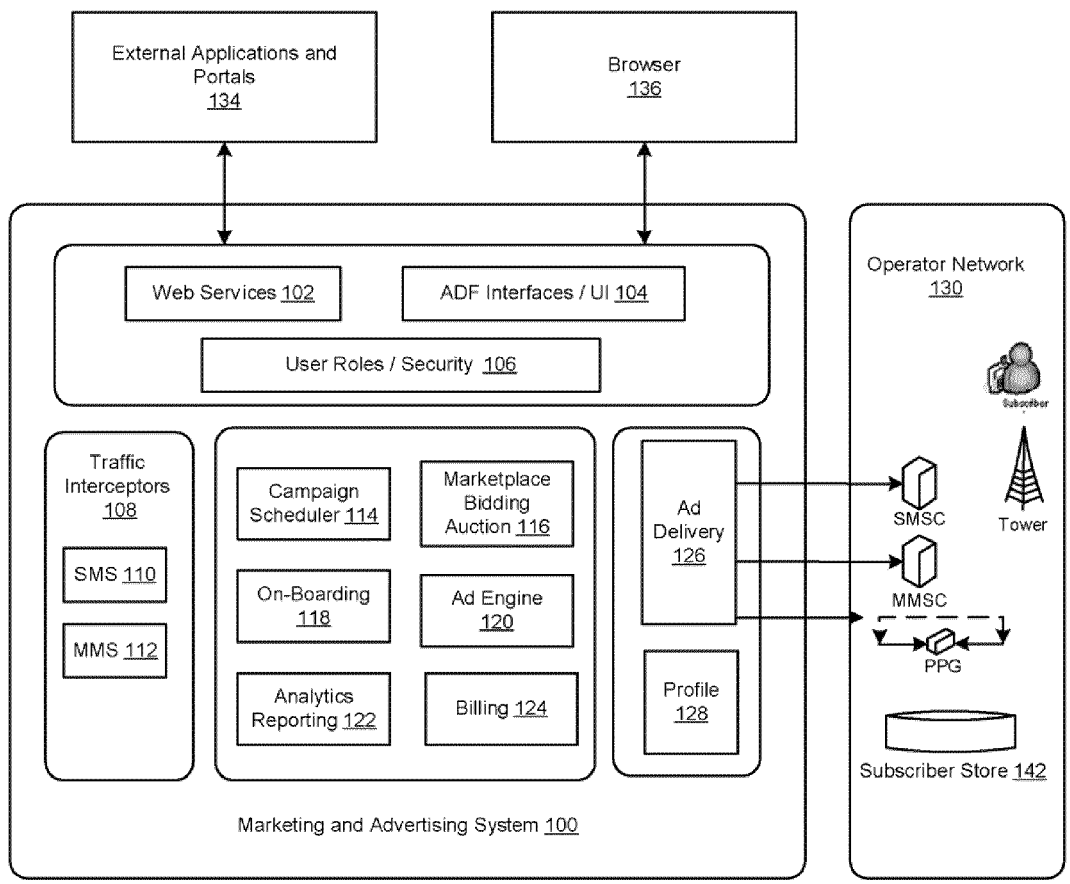
FIG. 1 is a high level illustration of the integration architecture for mobile advertisement campaign management, in accordance with various embodiments of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In this disclosure, an integration architecture is described for providing mobile advertisement (ad) campaign management using a marketplace and service provider interface (SPI). The architecture can be viewed as a communications marketing and advertisement system for delivering ad content to subscribers of a mobile telecommunications network over telecom-based channels, such as Short Messaging Service (SMS), Multimedia Messaging Service (MMS) and Wireless Application Protocol (WAP) Push. In one embodiment, the system is deployed by a network operator (e.g. AT&T, Verizon Wireless, T-Mobile, etc.) at the gateway to its telecom network. The system provides a way for the operator to manage and monetize the relationships between advertisers, various web application owners, subscribers and other entities.

In various embodiments, the system provides a marketplace component that allows ad space owners (e.g. owners of applications that send/receive SMS messages) to login and create ad spaces and put them up on auction. Various advertisers can then use the marketplace to bid on these ad spaces. Once the bids are submitted by the advertisers, they can remain pending until approved by the ad space owner. In this manner, the marketplace simplifies the pairing of advertisers with appropriate contexts for the promotional messages they wish to send. By using the marketplace, applications can offer ad spaces and advertisers can search for openings and bid on them. Based on network availability, operators can also offer customizable bulk messaging slots, purchased by advertisers on a fixed-price basis.

In one embodiment, once a bid has been approved by the ad space owner, it becomes a campaign that is scheduled and managed by a campaign manager of the system. A campaign is a set of ads that will be sent to subscribers of the telecom network. In one embodiment, the campaign specifies a start time, an end time and a number of messages that will be sent. There can be two types of campaigns—marketing campaigns and advertising campaigns.

In an advertising campaign, applications offer space in the messages they send out to subscribers. Advertising campaigns utilize these ad spaces to deliver an advertiser's content to subscribers. The event that triggers the sending of the ad comes from outside of the system. The cost associated with the advertising campaigns is arrived at through the auction process in the marketplace. One type of advertising campaigns is an application-to-person (A2P) campaign. In this campaign, messages originate with an application. The marketing system intercepts the messages as they travel to the subscriber and injects an ad into the message. Another type of advertising campaign is person-to-application (P2A). In this type of campaign, a subscriber may send a message to an application, such as a reality television voting application. The subscriber's message is intercepted on the way to the application and a response message for the subscriber is sent, for example thanking them for voting. This response message contains the ad.

In a marketing type of campaign, the system can actually act as a source of the messages sent to subscribers based on the configuration set by the advertisers. In one embodiment, a basic pattern is created, called a marketing space, which predefines basic characteristics of the possible ads (e.g. the available start and end times, the channel and the connection configuration to be used. The per unit cost can be fixed by the pattern. Advertisers select the space they wish to use and add their content. The system then creates the ads in bulks and sends them to subscribers either based on subscriber lists uploaded by the advertisers themselves, or according to various criteria. For example, some advertisers may already have their own lists of subscribers who wish to receive information from them. In this type of marketing campaign, the advertiser can simply upload its list to the system along with the ad content. The marketing system then creates the messages and sends them to the addresses on the list. In criteria-based marketing campaigns, the system owner and the network provider make certain demographic categories available from the subscriber database by using the subscriber profile module of the system. The advertiser then chooses the demographic group(s) that it wishes to target. The list of addresses is generated by the system and the messages with the ad content are sent to those addresses. In one embodiment, the actual list of addresses is hidden from the advertiser and not released to them.

Once the campaign has been scheduled and activated, an ad delivery component of the marketing system can carry out the transmission of all messages containing ad content to the subscribers. For example, an ad engine is responsible for the mechanics of matching ad content with the appropriate messaging context, whether it be ad spaces in intercepted messages from an application or bulk messages generated with the system itself. In criteria based campaigns, the engine is also responsible for ensuring that the subscribers who are targeted fit the correct demographic profile.

In various embodiments, the subscriber module allows the operator to collect aggregated statistical information about individual addresses used in a campaign for display in a graphical user interface (GUI) and to personalize ads by inserting information from a particular subscriber record. It also allows the operator to create address lists from the operator's own subscriber database based on selectable demographic information. Based on operators desire, the system can also create groupings of subscribers to be offered to advertisers based on configurable demographic categories. The system can also generate lists of addresses based on these categories for bulk messaging.

FIG. 1 is a high level illustration of the integration architecture for mobile advertisement campaign management, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the communications marketing and advertising system 100 can be deployed by a network operator and can be exposed to external applications and portals 134 over Web Services 102. It can also be made accessible by way of browser 136 enabled devices over ADF interfaces, UIs and the like 104. Access to the system can be controlled based on assigned user roles and other security measures 106. In one embodiment, the marketing and advertising system resides at the gateway to the operator's network.

The marketing and advertising system 100 includes a set of traffic interceptors 108 that can intercept message traffic between subscribers of the operator's network 130 and inject various advertisements therein, as well as perform a variety of other functions. For example, an SMS interceptor 110 may intercept an SMS message and transmit a response SMS with an advertisement embedded in the response. Similarly, an MMS interceptor 112 may intercept an MMS message and embed some content customized for the receiving subscriber according to their profile. The traffic interceptors can be applied as a chain in a particular sequence to the messages flowing through the network. Each interceptor may contain a set of filters to discern which messages it should be applied to, such that the interceptor is only executed for the messages containing a certain criteria.

The core of the marketing and advertising system can comprise a campaign manager or scheduler 114, a marketplace component 116, an on-boarding component 118, an ad engine 120, analytics and reporting 122 and a billing component 124. All of these components can enable the operator to allow advertisers to create marketing campaigns which will be carried out using the marketing system. These campaigns can be marketing campaigns based on bulk messages to lists of subscribers, or can be advertisement campaigns that embed ad content into messages or generate reply messages as responses to selected message traffic. In one embodiment, the advertiser creates a campaign based on available campaign spaces. It provides the ad content and, if desired, provides the subscriber lists for the marketing campaigns. The campaign is then carried out by transmitting the appropriate ads in accordance with various traffic handling techniques. In addition, the advertiser can monitor its campaigns and obtain access to the statistics for them.

The campaign scheduler 114 is responsible for scheduling the campaigns and managing their lifecycles, as will be described in further detail below with reference to FIG. 5. For example, when a bid is approved by an ad space owner, the ad space becomes an active campaign that is scheduled to run by the campaign scheduler 114.

The marketplace component 116 allows the operator to pair advertisers with various applications that may be sending or receiving SMS/MMS messages. Using the marketplace of the marketing and advertising system, applications can offer ad spaces and advertisers can search for openings and bid on them. As an illustration, if a text-to-vote television show were aired that was expected to receive a particular number of SMS votes, a corresponding ad campaign could be created. The various advertisers can then submit bids for an advertising spot in the exchange of SMS messages that would be transmitted over the network. For example, an organization can submit an electronic bid offering a particular amount for each SMS message. The network operator can then award the campaign to the winning bid. In this manner, the electronic marketplace provides the network operator with means for creating and monetizing relationships between advertisers, service providers (e.g. text-to-vote application) and mobile subscribers. Based on network availability, operators can also offer customizable bulk messaging slots, purchased by advertisers on a fixed-price basis, with the entire transaction enabled through the browser-based interface 136.

The ad engine 120 can be responsible for the mechanics of matching ad content with the appropriate messaging context, whether it be ad spaces in intercepted messages from an application or bulk messages generated by the system itself. The ad engine performs its functions once the campaign has been initiated through the graphical user interface (GUI). In criteria-based campaigns, the ad engine is also responsible for ensuring that the subscribers who are targeted fit the correct demographic profile as derived from the information obtained in the subscriber profile data store 142.

The analytics, reporting and statistics engine 122 can enable monitoring the progress of a campaign, such as the number of ads served, the ongoing cost/revenue and the like both as it happens in real time and collectively over longer periods of time. This monitoring can be used by the advertisers, applications and operators in various ways. The system can display data pertinent to each user type in both detailed tables and dashboard-like charts and graphs. Reports can also be exported.

The on-boarding component 118 can allow the operator to integrate various external partners, customers, advertisers and other entities with the communications marketing system 100. The on-boarding module can take care of registering the new entity so that appropriate access can be provided to the system from its perspective. In one embodiment, the registration on-boarding component 118 can assign users into various roles, such as system owner, network provider, ad space owner, advertiser and others.

The billing integration module 124 can produce detailed charging data records (CDRs) for each ad served through the system. The CDRs can be converted into Diameter Rf offline charging within the system and then passed onto billing systems such as billing and revenue management (BRM) systems for rating and billing.

Ad delivery 126 can be performed by employing the short messaging service center (SMS-C), multimedia messaging service centers (MMS-C), Push Proxy Gateway (PPG), and other internal network components of the operator. In addition, the subscriber profile module 128 can be used to retrieve subscriber information and obtain a list of people to be targeted with ads based on demographic information or specific attributes about a specific person being looked up based on their phone number. All of this targeting of advertisements can be based on the data that the network operator has in the subscriber store 142 about each of its subscribers.

Figure 2A:
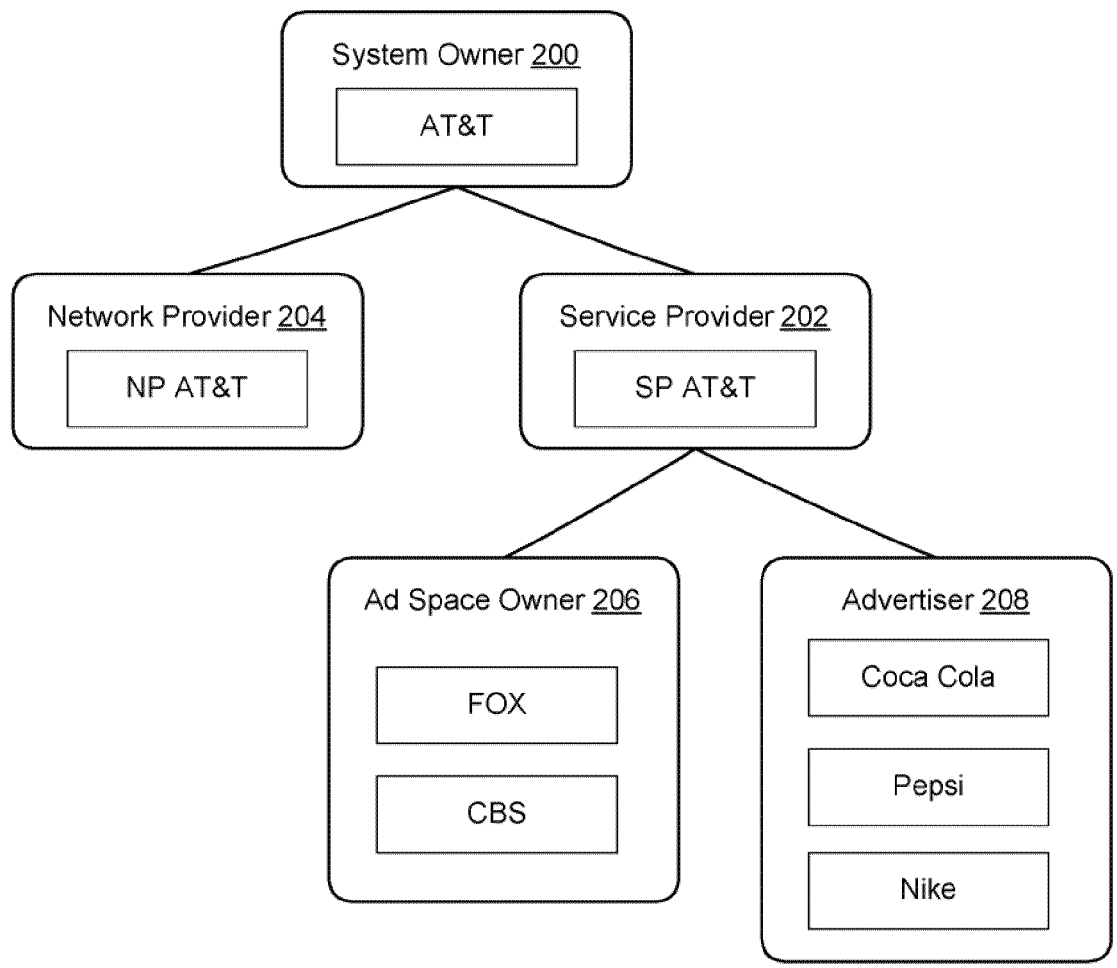
FIG. 2A is an illustration of the organization role hierarchy used by the communications marketing system, in accordance with various embodiments of the invention.

FIG. 2A is an illustration of the organization role hierarchy used by the communications marketing system, in accordance with various embodiments of the invention. As illustrated, each organization or user of the system can be assigned a role. The roles are shown in a particular hierarchy, however, it is not necessary for all embodiments of the invention that this particular hierarchy or these particular roles be used. Other variations are possible and within the scope of the present disclosure.

The system owner 200 represents the communications marketing and advertising system itself. In one embodiment, the system owner is responsible for creating the network provider organization and users and is also responsible for the ad service provider organization and users. The system owner can act as a user in any organization in the system and perform those tasks.

The network provider 204 represents the network over which the message traffic flows. In one embodiment, the network provider makes decisions on baseline usage patterns, including capacity and messaging type. These decisions are arranged into sets known as connection configurations which are assigned to ad space owners.

The ad service provider 202, represents the point of contact between the marketing system and its external users, i.e. the ad space owners and the advertisers. In one embodiment, the ad service provider creates advertisers and ad space owner organizations and users and manages the relationship. The ad service provider can own the marketplace and can act as a user in any of its advertiser or ad space owner organizations and perform those tasks. It can also create special advertising and marketing campaigns acting as a proxy for an advertiser. The ad service provider creates marketing spaces as a special ad space owner and can also monitor advertising and marketing campaigns.

The ad space owner 206 represent the applications that are offering space in their messages (e.g. SMS or MMS messages). In one embodiment, the ad space owner creates ad spaces in which advertisers can place their ads. The ad space owner can then approve or reject potential advertisers for campaigns using its ad spaces. It can also be provided with the ability to monitor the usage of its spaces.

The advertiser 208 represents the company or agency that wishes to promote its product or services. In one embodiment, the advertiser creates campaigns based on available campaign spaces. It provides ad content and if desired, provides subscriber lists for marketing campaigns. The advertiser can also monitor its campaigns.

Figure 2B:
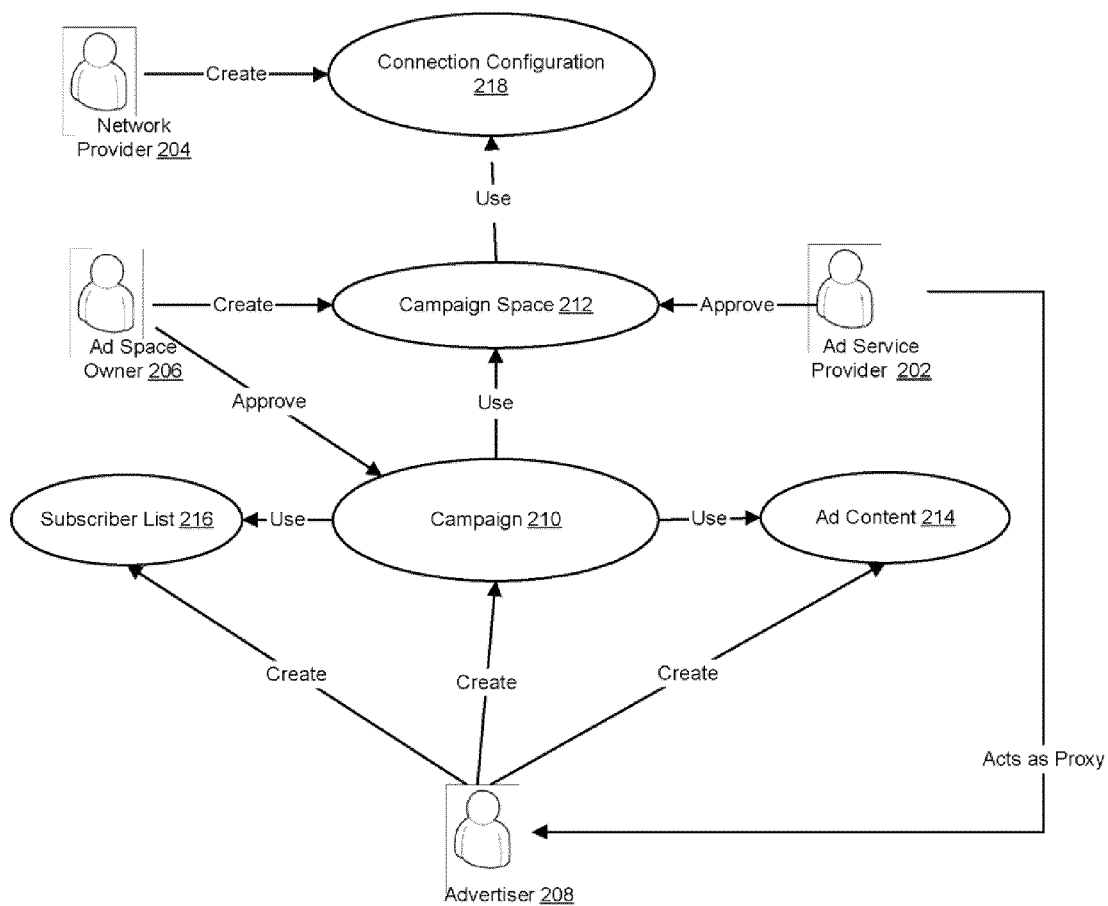
FIG. 2B is an illustration of the relationships between the various organizational roles of the communications marketing system, in accordance with various embodiments of the invention.

FIG. 2B is an illustration of the relationships between the various organizational roles of the communications marketing system, in accordance with various embodiments of the invention.

As illustrated, the network provider 204 can create and provide the connection configuration 218 used by the communications marketing system. The ad space owner 206 can create the campaign space 212 and can also approve the campaigns 210 that use that space. The ad service provider 202 can also approve the campaign space 212 and can also act as a proxy for the advertiser 208. The advertiser 208 can create the campaign 210 and ad content 214 to be inserted into the messages of that campaign 210. The advertiser can also create or upload its own subscriber lists 216 that will receive the ad content of the campaign.

Figure 3:
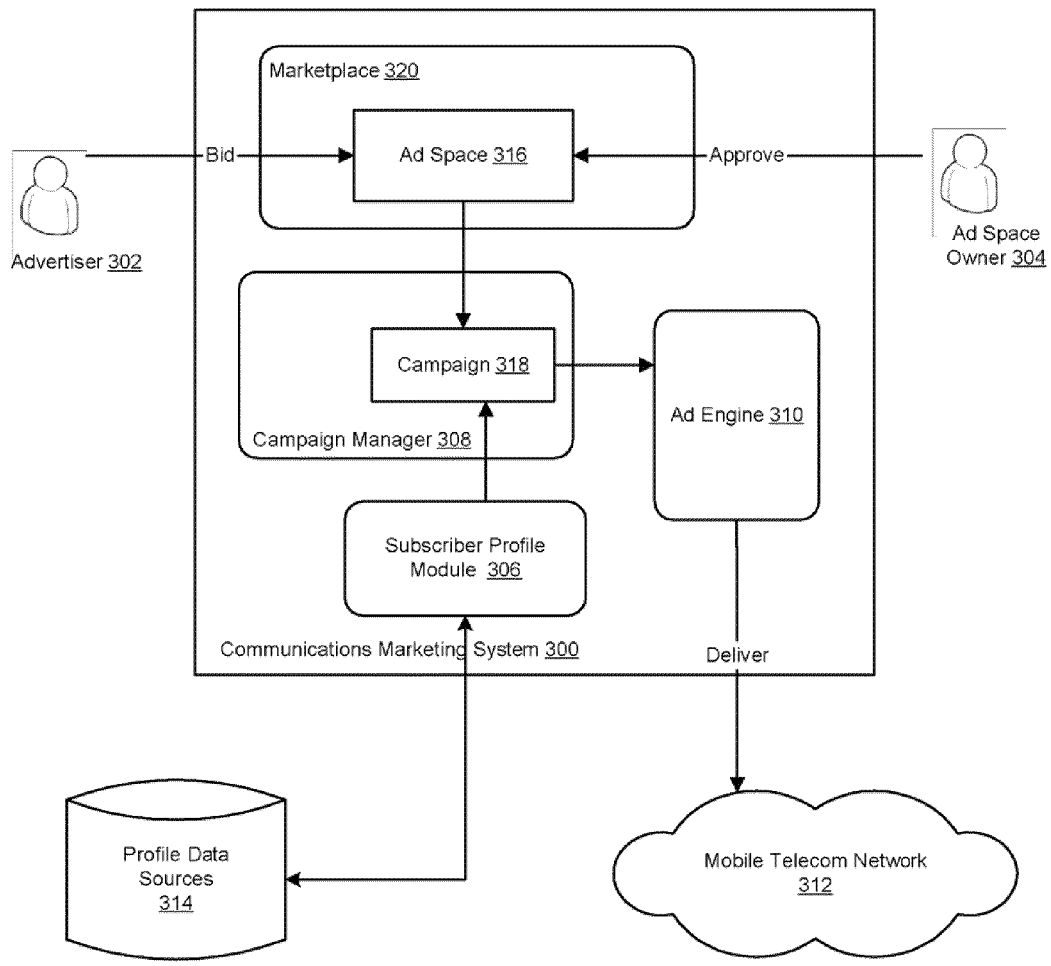
FIG. 3 is an illustration of a possible use of the communications marketing and advertising system, in accordance with various embodiments of the invention.

FIG. 3 is an illustration of a possible use of the communications marketing and advertising system, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the ad space owner 304 can create an ad space 316 using the marketplace component 320 of the system 300. For example, a weather channel online application may have a number of subscribers to which it regularly sends MMS messages regarding weather information. This application may wish to provide a space for ads in their MMS messages. This ad space can be placed on auction using the marketplace 320. An advertiser 302 (e.g. any company wishing to place advertising materials into the weather MMS message) can then bid on that ad space 316. In one embodiment, the bid may specify the ad content, the number of messages, and the amount that the advertiser is willing to pay for the ad space. The bid then remains pending until the ad space owner 304 approves or rejects the bid.

Once the bid has been approved by the ad space owner, it becomes a campaign 318 that is scheduled and managed by the campaign manager 308 of the system. In one embodiment, the campaign manager activates the campaign at which point the ad engine 310 can process the content, intercept and/or generate the appropriate messages and deliver the content to the subscribers via the telecom network 312.

The campaign can also personalize the messages based on the profile data that the subscriber profile module 306 obtains from the data sources 314. For example, the ad content can be personalized according the subscriber's name, location, known preferences or other profile information. In addition, the subscriber profile module can allow the advertiser to specify various demographic criteria about the recipients of the ad content, such as their age range, known interests, location and the like. In one embodiment, the actual subscriber information and lists of subscribers is not provided to the advertisers, enabling the operator to retain control of the information while still providing the ability to deliver the content to the desired recipients.

Figure 4A:
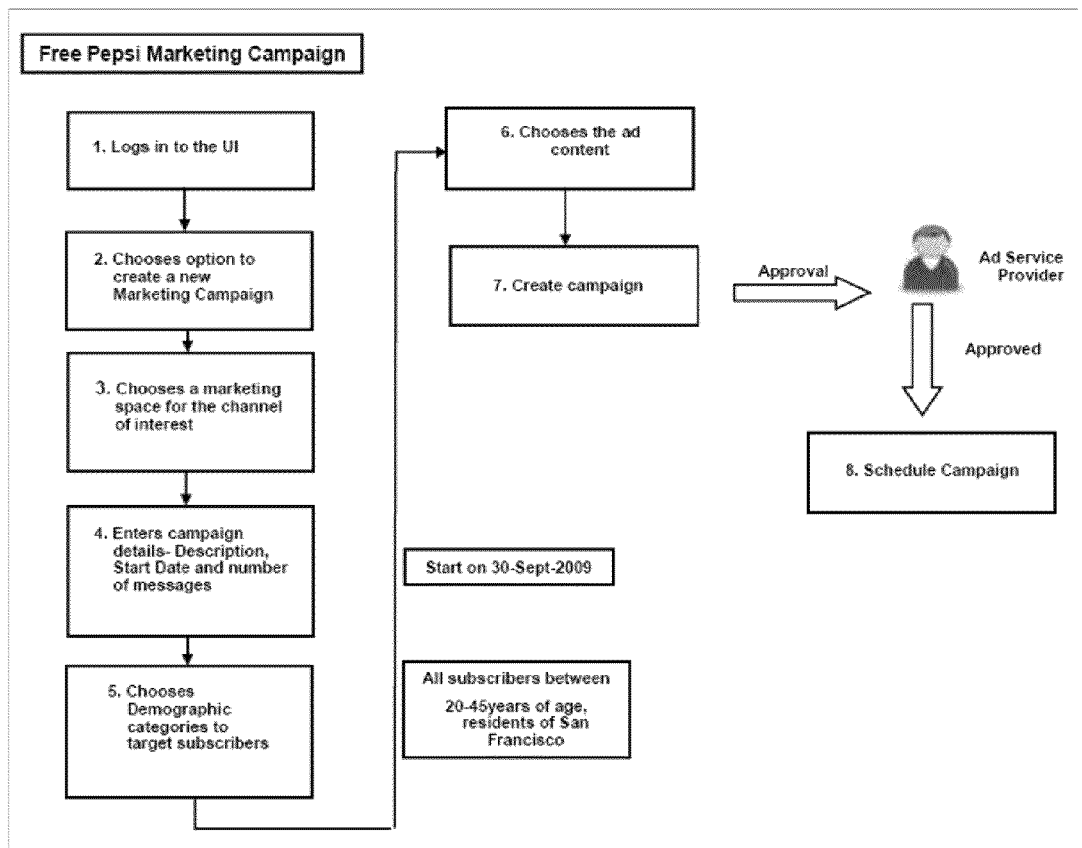
FIG. 4A is a flow chart diagram of creating a possible marketing campaign, in accordance with various embodiments of the invention.

FIG. 4A is a flow chart diagram of creating a possible marketing campaign, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated, an advertiser PepsiCo may create a marketing campaign by using the communications marketing system. It should be noted that PepsiCo is used only as an arbitrary example and that any company may fill the role of advertiser in the system. In step 1, the advertiser logs into the user interface (UI) of the system and, in step 2, chooses an option to create a new marketing campaign. The advertiser can then choose a marketing space for the channel of interest (step 3) and enters the campaign details, including the description, start date and number of messages that will be sent (step 4). In step 5, the advertiser can also choose the demographic categories of the target subscribers that will receive the ad content. For example, the advertiser may select that all subscribers be between the ages of 20 and 45 and be residents of San Francisco, Calif. The subscriber profile module of the system can obtain this information from the subscriber data sources that are accessible to the network operator. The system can allow the advertiser to specify this criteria while still precluding the advertiser from viewing the actual subscriber data.

In step 6, the advertiser can choose the ad content to be delivered, such as textual, multimedia image or video and/or sound to be displayed to the subscriber upon receiving the message. In step 7, the advertiser creates the campaign at which point it waits for approval from the ad service provider. Once the campaign has been approved, the campaign manager can schedule the campaign to be carried out, as shown in step 8.

Figure 4B:
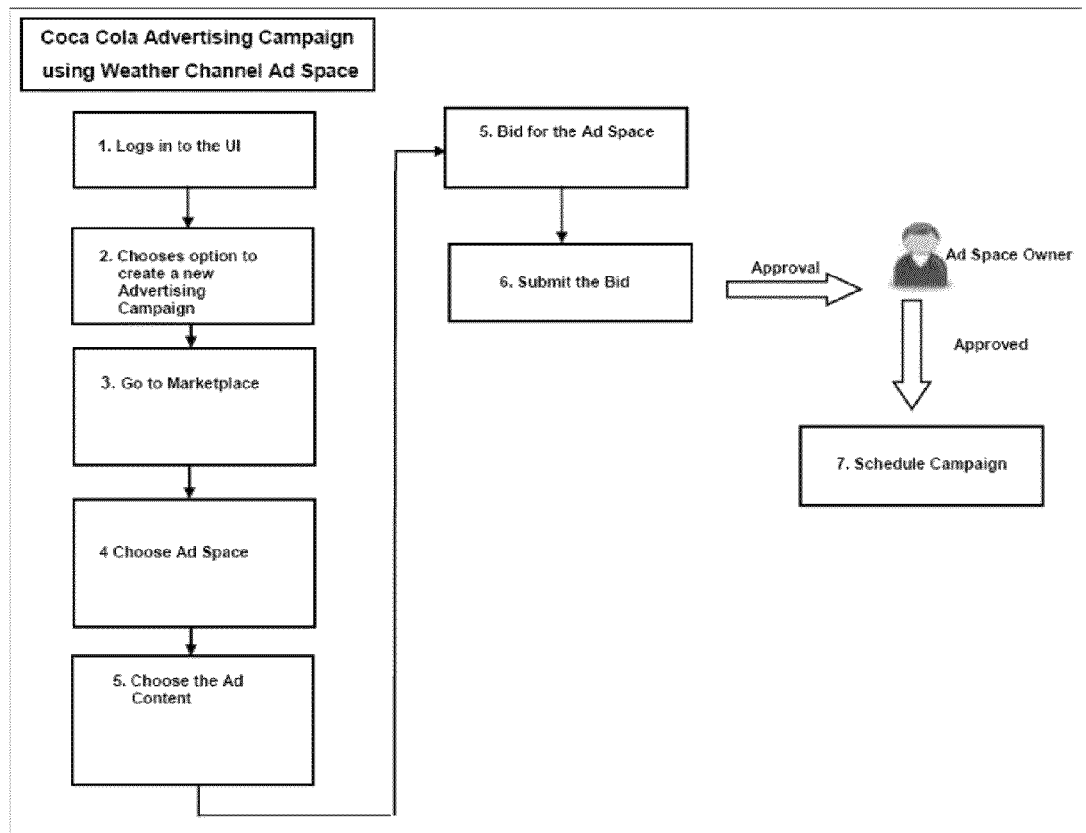
FIG. 4B is a flow chart diagram of creating a possible advertising campaign, in accordance with various embodiments of the invention.

FIG. 4B is a flow chart diagram of creating a possible advertising campaign, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated, an advertiser Coca Cola company can create an advertising campaign using the ad space provided by the weather channel application. In step 1, the advertiser logs into the UI and in step 2, they choose the option to create a new advertising campaign. In step 3, the advertiser enters the marketplace, where they can choose the ad space (step 4). In addition, the advertiser can choose the ad content (step 5) and create a bid for the ad space (step 5). In step 6, the advertiser can submit the bid, at which point it remains pending until approved or rejected by the ad space owner. Once the bid has been approved, the campaign can be scheduled by the campaign manager, as shown in step 7.

Figure 5:
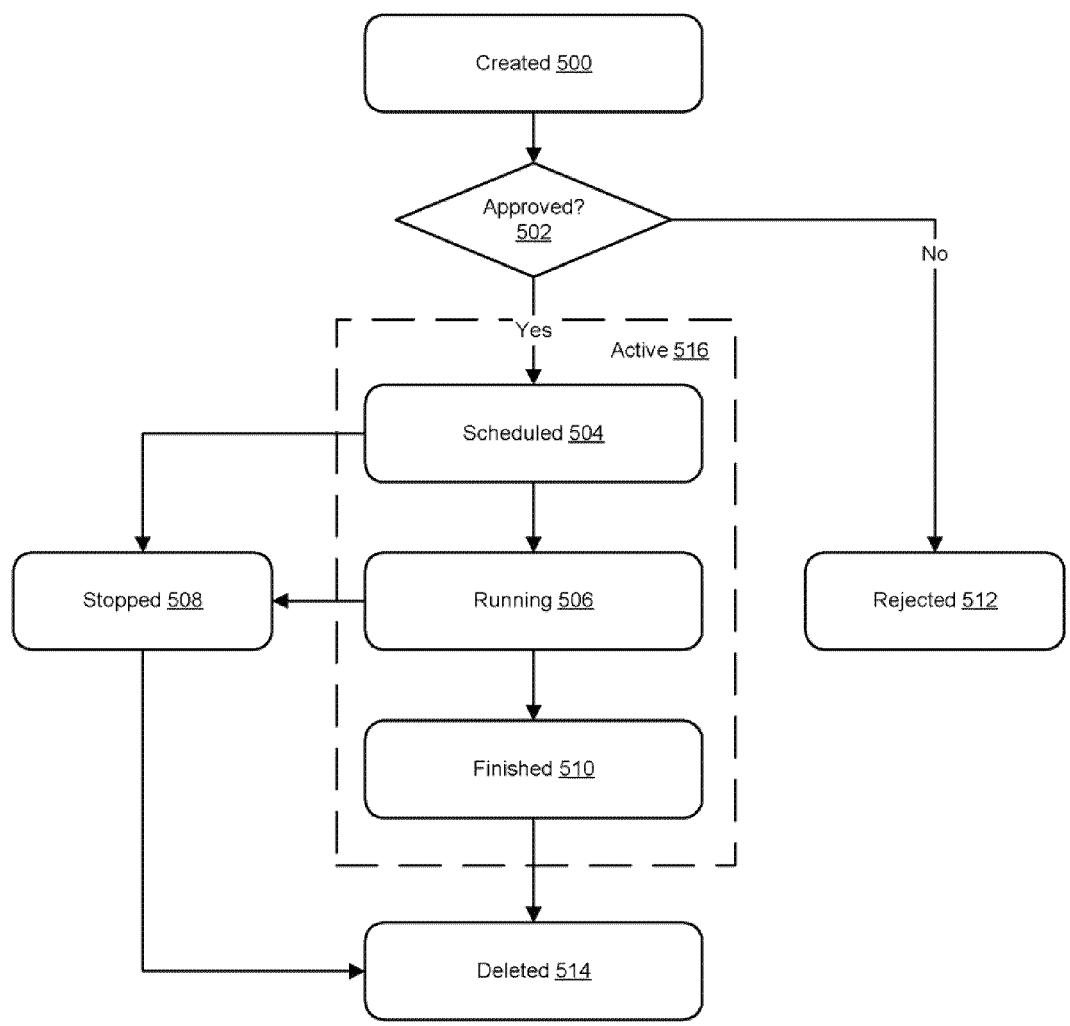
FIG. 5 is a flow chart diagram of a campaign lifecycle, in accordance with various embodiments of the invention.

FIG. 5 is a flow chart diagram of a campaign lifecycle, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, a campaign can be created by specifying the ad content, number of messages, start time and other information. Once created, the campaign waits until it is approved (step 502) either by the ad space owner or by the ad service provider, depending on the type of campaign. If the campaign is rejected 512, the lifecycle ends and the campaign never enters an active state 516. If the campaign is approved, it is scheduled (step 504) by the campaign scheduler and is running 506. Any time after scheduling the campaign, the campaign can be stopped (508) and deleted (514) if desired. Once the campaign is finished (510) it is complete and the data can be deleted.

Figure 6:
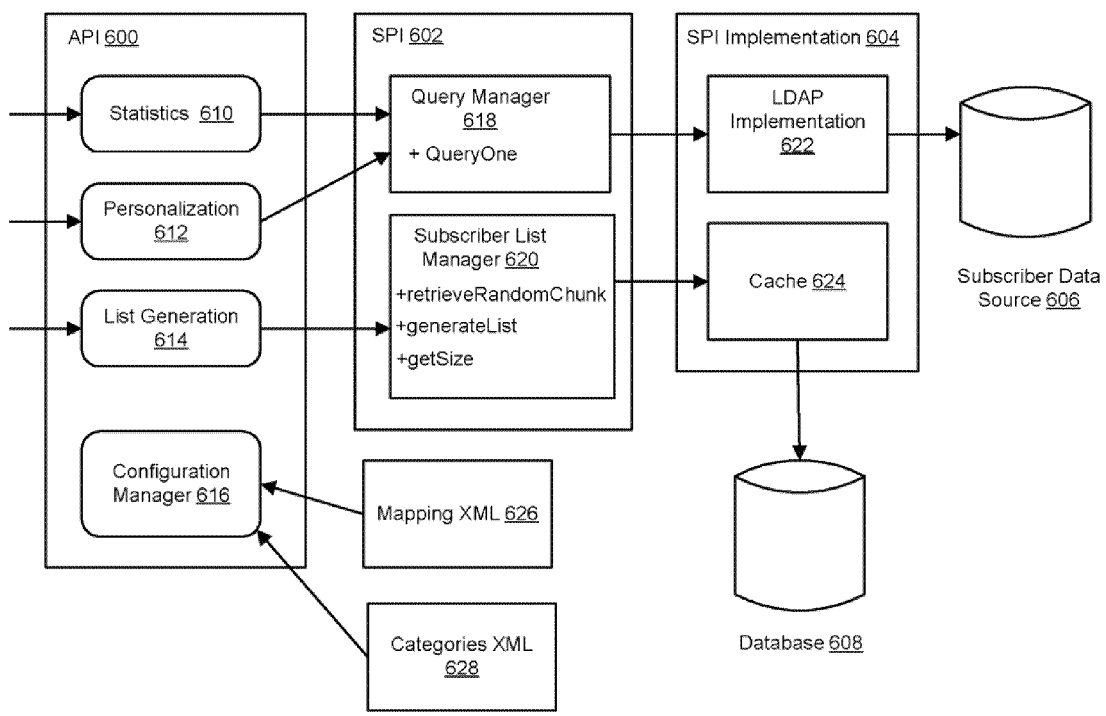
FIG. 6 is an illustration of the service provider interface, in accordance with various embodiments of the invention.

FIG. 6 is an illustration of the service provider interface, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the system can be accessed by way of an application programming interface (API) 600 to obtain the statistics 610, personalization 612 and list generation 614 information. For example, the statistics information can be used to measure the relative success of an advertising campaign. Similarly, the personalization aspect of the system can use profile information to tailor the message for each recipient with personal information. The API can also provide controlled access to create subscriber lists based on demographic information obtained using the profile data. In various embodiments, the API can also include a configuration manager 616 that can use XML mapping 626 and categories 628 to set various configuration information.

As further illustrated, the system can provide a service provider interface (SPI) 602 and its implementation 604 that plugs into the various subscriber data sources 606 over LDAP 622, as well as a local database 608. In on embodiment, the SPI 604 can include a query manager 618 that can provide useful queries for the statistics and personalization features of the API. In addition, the SPI can include a subscriber list manager 620 that can provide functions to retrieve information, generate lists, obtain size of the lists and the like. In one embodiment, the subscriber list manager can utilize a cache 624 in the SPI implementation for performance reasons.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing marketing and advertising content over communications, said system comprising:
    a marketplace component for creating an ad space for delivering advertising content to subscribers of a telecommunications network, wherein the marketplace component allows an advertiser to search for an opening in the ad space and submit a bid on the opening for approval by the ad space owner;
    a campaign manager that creates a campaign upon determining that the bid has been approved, wherein the campaign includes a set of messages to be sent to the subscribers;
    a subscriber profile module that retrieves profile data of the subscribers from a subscriber data source, and customizes the content of the set of messages according to the profile data;
    a set of traffic interceptors that intercept the set of messages and inject the advertising content therein, wherein the set of traffic interceptors are applied as a chain to the set of messages, each interceptor containing a set of filters to detect which message the interceptor should be applied to; and
    an ad engine that delivers the set of messages.

2. The system of claim 1, wherein the set of messages includes short messaging service (SMS) messages.

3. The system of claim 1, further comprising:
    a statistics engine that monitors the progress information of the campaign, including a number of ads served by said messages, and ongoing cost or revenue, both during runtime and collectively over time.

4. The system of claim 1, further comprising:
    a registration component that enables each of said plurality of users to register with the system, wherein each of the plurality of users is assigned to a role selected from a group comprising: a system owner, a network provider, a service provider, an ad space owner and an advertiser.

5. The system of claim 1, wherein the ad campaign includes a start time, an end time and a number of said messages.

6. The system of claim 1, wherein the profile data further includes one or more of the following:
    identity of the recipient of a short messaging service (SMS) message, location of the recipient, and calling pattern of the recipient.

7. The system of claim 1, further comprising:
a service provider interface (SPI) implemented by the system to retrieve the profile data.

8. The system of claim 1, further comprising:
a graphical user interface for selecting a set of demographic information retrieved by the subscriber profile module, wherein the profile data is hidden from the graphical user interface.

9. The system of claim 1, wherein the campaign is at least one of:
a marketing campaign that includes a set of bulk messages that is transmitted to subscribers of the telecom network based on an uploaded subscriber list, or according to a set of demographic criteria; and
an advertising campaign wherein an application offers space in the messages sent to subscribers of said application.

10. A method for providing marketing and advertising content over communications, said method comprising:
creating an ad space for delivering advertising content to subscribers of a telecommunications network in a marketplace component, which executes on one or more processors, and allows an advertiser to search for an opening in the ad space and submit a bid on the opening for approval by the ad space owner;
creating a campaign by a campaign manager upon determining that the bid has been approved, wherein the campaign includes a set of messages to be sent to the subscribers;
retrieving profile data of the subscribers from a subscriber data source, and customizing the content of the set of messages according to the profile data;
intercepting the set of messages, via a set of traffic interceptors, and injecting the advertising content in the set of messages, wherein the set of traffic interceptors are applied as a chain to the set of messages, each interceptor containing a set of filters to detect which message the interceptor should be applied to; and
transmitting the set of messages in the campaign.

11. The method of claim 10, wherein the set of messages includes short messaging service (SMS) messages.

12. The method of claim 10, further comprising:
monitoring the progress information of the campaign, including a number of ads served by said messages, and ongoing cost or revenue, both during runtime and collectively over time.

13. The method of claim 10, further comprising:
enabling each of said plurality of users to register with the marketplace component, wherein each of the plurality of users is assigned to a role selected from a group comprising: a system owner, a network provider, a service provider, an ad space owner and an advertiser.

14. The method of claim 10, wherein the ad campaign further includes a start time, an end time and a number of said messages.

15. The method of claim 10, wherein the profile data further includes one or more of the following:
identity of the recipient of a short messaging service (SMS) message, location of the recipient, and calling pattern of the recipient.

16. The method of claim 10, further comprising:
providing a service provider interface (SPI) for accessing the subscriber data source.

17. The method of claim 10, further comprising:
providing a graphical user interface for selecting a set of demographic information retrieved from a subscriber data source, wherein the profile data is hidden from the graphical user interface.

18. A non-transitory computer-readable storage medium storing a set of instructions for providing marketing and advertising over communications, said instructions, when executed by one or more processors, causing the one or more processors to perform the steps comprising:
creating an ad space for delivering advertising content to subscribers of a telecommunications network in a marketplace component, which executes on one or more processors, and allows an advertiser to search for an opening in the ad space and submit a bid on the opening for approval by the ad space owner;
creating a campaign by a campaign manager upon determining that the bid has been approved, wherein the campaign includes a set of messages to be sent to the subscribers;
retrieving profile data of the subscribers from a subscriber data source, and customizing the content of said messages according to the profile data;
intercepting the set of messages, via a set of traffic interceptors, and injecting the advertising content in the set of messages, wherein the set of traffic interceptors are applied as a chain to the set of messages, each interceptor containing a set of filters to detect which message the interceptor should be applied to; and
transmitting the set of messages in the campaign.

* * * * *